United States Patent
Yang et al.

(10) Patent No.: US 10,904,763 B2
(45) Date of Patent: Jan. 26, 2021

(54) NETWORK ACCESS METHOD AND DEVICE

(71) Applicant: HUAWEI TECHNOLOGIES CO., LTD., Guangdong (CN)

(72) Inventors: Haorui Yang, Shenzhen (CN); Yue He, Beijing (CN); Hui Jin, Beijing (CN); Guowei Ouyang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/345,314

(22) PCT Filed: Jan. 9, 2017

(86) PCT No.: PCT/CN2017/070675
§ 371 (c)(1),
(2) Date: Apr. 26, 2019

(87) PCT Pub. No.: WO2018/076553
PCT Pub. Date: May 3, 2018

(65) Prior Publication Data
US 2019/0281464 A1    Sep. 12, 2019

(30) Foreign Application Priority Data

Oct. 27, 2016  (WO) ................ PCT/CN2016/103624

(51) Int. Cl.
*H04M 1/66*         (2006.01)
*H04W 12/08*        (2009.01)
(Continued)

(52) U.S. Cl.
CPC ........ *H04W 12/0804* (2019.01); *H04B 1/385* (2013.01); *H04L 63/0884* (2013.01);
(Continued)

(58) Field of Classification Search
USPC .............................. 455/410, 411, 435.1–439
See application file for complete search history.

(56) References Cited

U.S. PATENT DOCUMENTS

2013/0288668 A1   10/2013  Pragada et al.
2015/0029866 A1    1/2015  Liao et al.
(Continued)

FOREIGN PATENT DOCUMENTS

CN    101227452 A    7/2008
CN    101662473 A    3/2010
(Continued)

OTHER PUBLICATIONS

ZTE, "Solution for Prose discovery", XP050709422 S2-132285 SA WG2 Meeting #97, May 27-31, 2013, Busan, South Korea, 5 pages.
(Continued)

*Primary Examiner* — Suhail Khan
(74) *Attorney, Agent, or Firm* — Fish & Richardson P.C.

(57) ABSTRACT

This application discloses a network access method and device. The method includes: receiving, by a first management entity, a first request message sent by a first terminal, where the first request message includes at least a first identifier of a second terminal; determining, by the first management entity based on a first condition, whether the second terminal can access a network by using the first terminal, where the first condition includes at least that the first identifier of the second terminal belongs to a list of at least one terminal having a trust relationship with the first terminal, and the list includes at least a first identifier of the at least one terminal having the trust relationship with the first terminal. Legality of access by a wearable device to a network by using a user terminal can be authenticated by using the method and device in this application.

6 Claims, 6 Drawing Sheets

(51) Int. Cl.
  *H04W 12/00* (2009.01)
  *H04B 1/3827* (2015.01)
  *H04L 29/06* (2006.01)
  *H04W 8/08* (2009.01)
  *H04W 8/26* (2009.01)

(52) U.S. Cl.
  CPC .............. *H04W 8/08* (2013.01); *H04W 8/26* (2013.01); *H04W 12/003* (2019.01); *H04W 12/004* (2019.01); *H04W 12/00506* (2019.01)

(56) References Cited

U.S. PATENT DOCUMENTS

| | | |
|---|---|---|
| 2015/0045044 A1 | 2/2015 | Liu et al. |
| 2015/0326302 A1 | 11/2015 | Stojanovski et al. |
| 2015/0382159 A1 | 12/2015 | Kim et al. |
| 2016/0029423 A1* | 1/2016 | Ke .................. H04L 5/14 370/329 |
| 2016/0197927 A1 | 7/2016 | Ma et al. |
| 2016/0286471 A1 | 9/2016 | Zisimopoulos et al. |
| 2016/0373183 A1 | 12/2016 | Yi et al. |
| 2018/0123682 A1 | 5/2018 | Jung et al. |
| 2018/0199262 A1* | 7/2018 | Kuge .................. H04W 8/00 |

FOREIGN PATENT DOCUMENTS

| | | |
|---|---|---|
| CN | 102740296 A | 10/2012 |
| CN | 103533012 A | 1/2014 |
| CN | 103716483 A | 4/2014 |
| CN | 104272707 A | 1/2015 |
| CN | 104363665 A | 2/2015 |
| CN | 104469695 A | 3/2015 |
| CN | 104580134 A | 4/2015 |
| CN | 104618891 A | 5/2015 |
| CN | 104735606 A | 6/2015 |
| CN | 104902443 A | 9/2015 |
| CN | 104956703 A | 9/2015 |
| CN | 104994106 A | 10/2015 |
| CN | 105848083 A | 8/2016 |
| EP | 3038407 A1 | 6/2016 |
| KR | 20160019578 A | 2/2016 |
| WO | 2015103969 A1 | 7/2015 |
| WO | 2016073984 A2 | 5/2016 |
| WO | 2016112678 A1 | 7/2016 |
| WO | 2016159742 A1 | 10/2016 |
| WO | 2016163823 A1 | 10/2016 |

OTHER PUBLICATIONS

LG Electronics,"Update of solution D13 to support model B", XP050744594 S2-140274 SA WG2 Meeting #101, Jan. 20-24, 2014,Taipei,Taiwan, 6 pages.

Huawei,"Procedures and information flows clause 10-GAA", XP051117493 S6-160585 3GPP TSG-SA WG6 Meeting #11,Bangalore, India, May 23-27, 2016,19 pages.

Huawei et al.,"Solution for Key Issue Trust relationship between eRemote-UE and eRelay-UE", XP051205688 S2-170250 SA WG2 Meeting #118-bis,Jan. 16-20, 2017,Spokane,WA,USA, 3 pages.

3GPP TS 23303 V14.0.0, 3rd Generation Partnership Project, Technical Specification Group Services and System Aspects, Proximity-based services (ProSe); Stage 2(Release 14), Sep. 2016, 124 pages.

3GPP TS 24.334 V13.5.0, 3rd Generation Partnership Project, Technical Specification Group Core Network and Terminals, Proximity-services (ProSe) User Equipment (UE) to ProSe function protocol aspects, Stage 3(Release 13), Sep. 2019, 260 pages.

Extended European Search Report issued in European Application No. 17863681.7, dated Jun. 3, 2019, 11 pages.

PCT International Search Report and Written Opinion in International Application No. PCT/CN2016/103,624, dated Jul. 24, 2017, 16 pages.

PCT International Search Report and Written Opinion in International Application No. PCT/CN2017/070,675, dated Oct. 27, 2016, 20 pages (With English Translation).

Office Action issued in Chinese Application No. 201780002049.2 dated Oct. 29, 2019, 20 pages (with English translation).

S2-140668 ZTE,"Corrections on ProSe Relay",SA WG2 Meeting #101bis,San Jose Del Cabo, Mexico, Feb. 17-21, 2014,total 6 pages.

Office Action issued in Chinese Application No. 201780002049.2 dated Jul. 16, 2020, 10 pages (with English translation).

* cited by examiner

NETWORK ACCESS METHOD AND DEVICE

CROSS REFERENCE TO RELATED APPLICATIONS

This application is a national stage of International Application No. PCT/CN2017/070675, filed on Jan. 9, 2017, which claims priority to International Application No. PCT/CN2016/103624, filed on Oct. 27, 2016. Both of the aforementioned applications are hereby incorporated by reference in their entireties.

TECHNICAL FIELD

This application relates to the field of mobile communications technologies, and in particular, to a network access method and device.

BACKGROUND

With the rapid development of the Internet, wearable devices are developed. The wearable device is a portable device that can be directly worn by a user, for example, a smartwatch or a smart band. Generally, a SIM (Subscriber Identification Module, subscriber identification module) card is installed in most wearable devices, and a user can access a network by using the wearable device.

Currently, limited by a volume of a wearable device, in a process of network access by using the wearable device, there are mainly the following problems: A battery is small, and a standby time is short; only a single antenna can be implemented, and consequently, the wearable device needs to spend a longer time in sending a same amount of data compared with a multi-antenna device.

In most application scenarios, there is a high-performance terminal around a wearable device, such as a smartphone. Therefore, to resolve the foregoing problems of a wearable device in a network access process, a person related in the art provides a technical solution in which a wearable device accesses a network by using a terminal as a relay. This is specifically as follows: The terminal sends broadcast information; and after receiving the broadcast information, the wearable device can discover the terminal around the wearable device. In this case, the wearable device may send a communication data packet to the terminal, and the terminal may upload the communication data packet to the network. In this way, the wearable device can access the network by using the terminal as the relay. However, in the foregoing technical solution, any wearable device receiving the broadcast message of the terminal can access the network by using the terminal as the relay. In the prior art, a first parameter needs to be set in the terminal, so that the terminal can manage access of the wearable device. This parameter may be specifically allowing all terminals to perform access, or may be specifically allowing an authorized wearable device to perform access. A user may set the first parameter based on a requirement of the user. However, when the user sets the first parameter of the terminal to allowing the authorized wearable device to perform access, there is currently no solution for the network to perform authentication on the wearable device.

SUMMARY

Embodiments of this application provide a network access method and device, to perform authentication on a wearable device.

According to a first aspect of this application, a network access method is provided, including: receiving, by a first management entity, a first request message sent by a first terminal, where the first request message includes at least a first identifier of a second terminal; determining, by the first management entity based on a first condition, whether the second terminal can access a network by using the first terminal, where the first condition includes at least that the first identifier of the second terminal belongs to a list of at least one terminal having a trust relationship with the first terminal, and the list includes at least a first identifier of the at least one terminal having the trust relationship with the first terminal; and when the first condition is satisfied, sending, by the first management entity, a second message to the second terminal, where the second message is used to indicate that the second terminal can access the network by using the first terminal.

With reference to the first aspect, in a first possible implementation, the first identifier of the second terminal is allocated by a second function entity to the second terminal.

With reference to the first aspect, in a second possible implementation, the first request message further includes a first parameter of the first terminal; and the determining, by the first management entity based on a first condition, whether the second terminal can access a network by using the first terminal includes: when the first parameter indicates that only a terminal having the trust relationship is allowed to access the network, determining, by the first management entity based on the first condition, whether the second terminal can access the network by using the first terminal.

With reference to any one of the first aspect, the first possible implementation of the first aspect, or the second possible implementation of the first aspect, in a third possible implementation, the list of the at least one terminal having the trust relationship with the first terminal further includes a permanent user identifier of the at least one terminal having the trust relationship with the first terminal.

With reference to the third possible implementation of the first aspect, in a fourth possible implementation, the first request message further includes a temporary identifier of the second terminal, and the first condition further includes that a first permanent user identifier corresponding to the temporary identifier of the second terminal is the same as a second permanent user identifier corresponding to the first identifier of the second terminal in the list.

With reference to the fourth possible implementation of the first aspect, in a fifth possible implementation, a first permanent network identifier corresponding to a temporary network identifier of the second terminal is obtained in the following manner: when a context of the second terminal is stored, obtaining, by the first management entity, the first permanent user identifier of the second terminal from the context of the second terminal; or when no context of the second terminal is stored, sending, by the first management entity, a request to a second management entity providing a service to the second terminal, to obtain the first permanent user identifier of the second terminal.

With reference to any one of the first aspect, or the first possible implementation, the second possible implementation, the third possible implementation, the fourth possible implementation, or the fifth possible implementation of the first aspect, in a sixth possible implementation, the list of the at least one terminal having the trust relationship with the first terminal is obtained in the following manner: receiving, by the first management entity, a trust relationship between the first terminal and the second terminal that is sent by a first function entity, and generating, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, and the third request is used to establish the trust relationship between the first terminal and the second terminal; or receiving, by the first management entity, a trust relationship between the first terminal and the second terminal that is sent by a first server, and generating, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, the generated trust relationship between the first terminal and the second terminal is forwarded to the first server, and the third request is used to establish the trust relationship between the first terminal and the second terminal.

With reference to any one of the first aspect, or the first possible implementation, the second possible implementation, the third possible implementation, the fourth possible implementation, the fifth possible implementation, or the sixth possible implementation of the first aspect, in a seventh possible implementation, the list further includes first duration of the trust relationship between the first terminal and the second terminal, and the method further includes: when the trust relationship with the second terminal that is stored in the list reaches the first duration, deleting, by the first management entity, the trust relationship between the first terminal and the second terminal from the list.

According to a second aspect, a relay terminal discovery method is provided, including: receiving, by a second terminal, a first discovery message sent by a first terminal, where the first discovery message is used to enable any terminal to discover the first terminal, and the first discovery message includes at least an identifier of a public land network serving the first terminal; and determining, by the second terminal based on a second condition, whether the first terminal can provide a relay service to the second terminal, where the second condition includes at least that an identifier of a public land network serving the second terminal is the same as the identifier of the public land network serving the first terminal; and when the second condition is satisfied, determining, by the second terminal, that the first terminal can provide the relay service to the second terminal.

With reference to the second aspect, in a first possible implementation, the first discovery message further includes a second parameter, and the second parameter is used to indicate that the first discovery message is used for relay discovery.

With reference to the second aspect or the first possible implementation of the second aspect, in a second possible implementation, the first discovery message further includes a first codeword, and the first codeword is used to indicate a type of the relay service provided by the first terminal; and the second condition further includes that a type of a relay service required by the second terminal is the same as the type of the relay service indicated by the first codeword.

According to a third aspect, a relay terminal discovery method is provided, including: receiving, by a second terminal, a second discovery message sent by a first terminal, where the second discovery message is used to enable a terminal having a trust relationship with the first terminal to discover the first terminal, the second discovery message includes at least a second codeword of the first terminal, and the second codeword is a codeword that is allocated by a first function entity to the first terminal and that is used for relay discovery; determining, by the second terminal based on a third condition, whether the first terminal can provide a relay service to the second terminal, where the third condition includes at least that the second codeword of the first terminal is the same as a third codeword stored by the second terminal, and the third codeword is sent by the first function entity to the second terminal when a trust relationship is established between the first terminal and the second terminal; and when the third condition is satisfied, determining, by the second terminal, that the first terminal can provide the relay service to the second terminal.

With reference to the third aspect, in a first possible implementation, the second discovery message further includes a third parameter, and the third parameter is used to indicate that the second discovery message is used for relay discovery.

According to a fourth aspect, a trust relationship establishment method is provided, including: receiving, by a first function entity, a first message of a first terminal, where the first message includes at least an identifier of the first terminal and an identifier of a second terminal, and the first message is used to request the first function entity to establish a trust relationship between the first terminal and the second terminal; when determining that the first terminal is authorized to allow another terminal to access a network by using the first terminal and the second terminal is authorized to access the network by using another terminal, establishing, by the first function entity, the trust relationship between the first terminal and the second terminal based on the identifier of the first terminal and the identifier of the second terminal; and sending, by the first function entity, the trust relationship between the first terminal and the second terminal to a first management entity.

With reference to the fourth aspect, in a first possible implementation, the first message further includes second duration of the trust relationship, and the second duration is effective duration of the trust relationship between the first terminal and the second terminal that is requested by the first terminal or the second terminal; and the method further includes: generating, by the first function entity, first duration of the trust relationship with the second terminal based on the second duration in the first message, where the first duration is actual effective duration of the trust relationship between the first terminal and the second terminal.

With reference to the fourth aspect, in a second possible implementation, the method further includes: after establishing the trust relationship, sending, by the first function entity, first duration of the trust relationship to the first terminal.

With reference to the fourth aspect, in a third possible implementation, the method further includes: after establishing the trust relationship, sending, by the first function entity, a first codeword to the second terminal, where the first codeword is a codeword that is allocated by the first function entity to the first terminal and that is used for relay discovery.

With reference to the fourth aspect, in a fourth possible implementation, the method further includes: after establishing the trust relationship, sending, by the first function entity, first duration of the trust relationship to the second terminal.

According to a fifth aspect, a network access device is provided, including: a transceiver, configured to receive a first request message sent by a first terminal, where the first request message includes at least a first identifier of a second terminal; and a processor, configured to: determine, based on a first condition, whether the second terminal can access a network by using the first terminal; and when the first condition is satisfied, send, by the first management entity, a second message to the second terminal, where the second message is used to indicate that the second terminal can access the network by using the first terminal, the first condition includes at least that the first identifier of the second terminal belongs to a list of at least one terminal having a trust relationship with the first terminal, and the list includes at least a first identifier of the at least one terminal having the trust relationship with the first terminal.

With reference to the fifth aspect, in a first possible implementation, the first request message further includes a first parameter of the first terminal; and when determining, based on the first condition, whether the second terminal can access the network by using the first terminal, the processor is specifically configured to: when the first parameter indicates that only a terminal having the trust relationship is allowed to access the network, determine, based on the first condition, whether the second terminal can access the network by using the first terminal.

With reference to any one of the fifth aspect, the first possible implementation of the fifth aspect, or the second possible implementation of the fifth aspect, in a third possible implementation, the list of the at least one terminal having the trust relationship with the first terminal further includes a permanent user identifier of the at least one terminal having the trust relationship with the first terminal.

With reference to the third possible implementation of the fifth aspect, in a fourth possible implementation, the first request message further includes a temporary identifier of the second terminal, and the first condition further includes that a first permanent user identifier corresponding to the temporary identifier of the second terminal is the same as a second permanent user identifier corresponding to the first identifier of the second terminal in the list.

With reference to the fourth possible implementation of the fifth aspect, in a fifth possible implementation, the processor is further configured to: when a context of the second terminal is stored, obtain the first permanent user identifier of the second terminal from the context of the second terminal; or when no context of the second terminal is stored, send a request to a second management entity providing a service to the second terminal, to obtain the first permanent user identifier of the second terminal.

With reference to any one of the fifth aspect, or the first possible implementation, the second possible implementation, the third possible implementation, the fourth possible implementation, or the fifth possible implementation of the fifth aspect, in a sixth possible implementation, the transceiver is further configured to receive a trust relationship between the first terminal and the second terminal that is sent by a first function entity; and the processor is further configured to generate, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, and the third request is used to establish the trust relationship between the first terminal and the second terminal; or the transceiver is further configured to receive a trust relationship between the first terminal and the second terminal that is sent by a first server, and the processor is further configured to generate, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, the generated trust relationship between the first terminal and the second terminal is forwarded to the first server, and the third request is used to establish the trust relationship between the first terminal and the second terminal.

With reference to any one of the fifth aspect, or the first possible implementation, the second possible implementation, the third possible implementation, the fourth possible implementation, the fifth possible implementation, or the sixth possible implementation of the fifth aspect, in a seventh possible implementation, the list further includes first duration of the trust relationship between the first terminal and the second terminal, and the processor is further configured to:

when the trust relationship with the second terminal that is stored in the list reaches the first duration, delete the trust relationship between the first terminal and the second terminal from the list.

According to a sixth aspect, a relay terminal discovery device is provided, including:

a transceiver, configured to receive a first discovery message sent by a first terminal, where the first discovery message is used to enable any terminal to discover the first terminal, and the first discovery message includes at least an identifier of a public land network serving the first terminal; and a processor, configured to: determine, based on a second condition, whether the first terminal can provide a relay service to the second terminal; and when the second condition is satisfied, determine, by the second terminal, that the first terminal can provide the relay service to the second terminal, where the second condition includes at least that an identifier of a public land network serving the second terminal is the same as the identifier of the public land network serving the first terminal.

With reference to the sixth aspect, in a first possible implementation, the first discovery message further includes a second parameter, and the second parameter is used to indicate that the first discovery message is used for relay discovery.

With reference to the sixth aspect or the first possible implementation of the sixth aspect, in a second possible implementation, the first discovery message further includes a first codeword, and the first codeword is used to indicate a type of the relay service provided by the first terminal; and the second condition further includes that a type of a relay service required by the second terminal is the same as the type of the relay service indicated by the first codeword.

According to a seventh aspect, a relay terminal discovery device is provided, including:

a transceiver, configured to receive a second discovery message sent by a first terminal, where the second discovery message is used to enable a terminal having a trust relationship with the first terminal to discover the first terminal, the second discovery message includes at least a second codeword of the first terminal, and the second codeword is a codeword that is allocated by a first function entity to the first terminal and that is used for relay discovery; and a processor, configured to determine, based on a third condition, whether the first terminal can provide a relay service to the second terminal; and when the third condition is satisfied, determine, by the second terminal, that the first terminal can provide the relay service to the second terminal, where the third condition includes at least that the second codeword of the first terminal is the same as a third codeword stored by the second terminal, and the third codeword is sent by the first function entity to the second terminal when a trust relationship is established between the first terminal and the second terminal.

With reference to the seventh aspect, in a first possible implementation, the second discovery message further includes a third parameter, and the third parameter is used to indicate that the second discovery message is used for relay discovery.

According to an eighth aspect, a trust relationship establishment device is provided, including:

a transceiver, configured to: receive a first message of a first terminal, and send a trust relationship between the first terminal and a second terminal to a first management entity, where the first message includes at least an identifier of the first terminal and an identifier of the second terminal, and the first message is used to request a first function entity to establish the trust relationship between the first terminal and the second terminal; and a processor, configured to: when it is determined that the first terminal is authorized to allow another terminal to access a network by using the first terminal and the second terminal is authorized to access the network by using another terminal, establish the trust relationship between the first terminal and the second terminal based on the identifier of the first terminal and the identifier of the second terminal.

With reference to the eighth aspect, in a first possible implementation, the first message further includes second duration of the trust relationship, and the second duration is effective duration of the trust relationship between the first terminal and the second terminal that is requested by the first terminal or the second terminal; and the processor is further configured to:

generate first duration of the trust relationship with the second terminal based on the second duration in the first message, where the first duration is actual effective duration of the trust relationship between the first terminal and the second terminal.

With reference to the eighth aspect, in a second possible implementation, the processor is further configured to:

after the trust relationship is established, send first duration of the trust relationship to the first terminal.

With reference to the eighth aspect, in a third possible implementation, the transceiver is further configured to:

after the trust relationship is established, send a first codeword to the second terminal, where the first codeword is a codeword that is allocated by the first function entity to the first terminal and that is used for relay discovery.

With reference to the eighth aspect, in a fourth possible implementation, the transceiver is further configured to:

after the trust relationship is established, send first duration of the trust relationship to the second terminal.

As can be seen from above, in the embodiments of this application, the first management entity can receive the first request message sent by the first terminal, and determine, based on the first condition, whether the second terminal can access the network by using the first terminal. When the first terminal satisfies the first condition, the first management entity sends the second message to the second terminal. The second message may indicate that the second terminal can access the network by using the first terminal. In the manners disclosed in the embodiments of this application, when the first terminal is user equipment and the second terminal is a wearable device, the wearable device can be authenticated, so that only the wearable device satisfying the first condition can access the network by using the user equipment.

DESCRIPTION OF EMBODIMENTS

The following clearly and completely describes the technical solutions in the embodiments of this application with reference to the accompanying drawings in the embodiments of this application.

With the rapid development of the Internet, wearable devices (Wearable Device, WD) are developed. The WD is a portable device that can be directly worn by a user, for example, a smartwatch or a smart band. Generally, a SIM (Subscriber Identification Module, subscriber identification module) card is installed in most WDs, and a user can access a network by using the WD.

Currently, limited by a volume of a WD, in a process of network access by using the wearable device, there are mainly the following problems: A battery is small, and a standby time is short; only a single antenna can be implemented, and consequently the wearable device needs to consume a longer time to send a same amount of data compared with a multi-antenna device.

In most application scenarios, there is high-performance UE (User Equipment, user equipment) around a WD, such as a smartphone. Based on the above, this application provides a technical solution in which the WD accesses the network by using the UE. In this technical solution, for ease of description, the UE is specifically referred to as a first terminal, and the WD is referred to as a second terminal. There are mainly four parts in this solution: A first part is registration of the first terminal and the second terminal; a second part is mutual discovery between the first terminal and the second terminal; a third part is establishment of a trust relationship between the first terminal and the second terminal, where the trust relationship may be that the first terminal authorizes the second terminal to access the network by using the first terminal; and a fourth part is access by the second terminal to the network.

Figure 1:
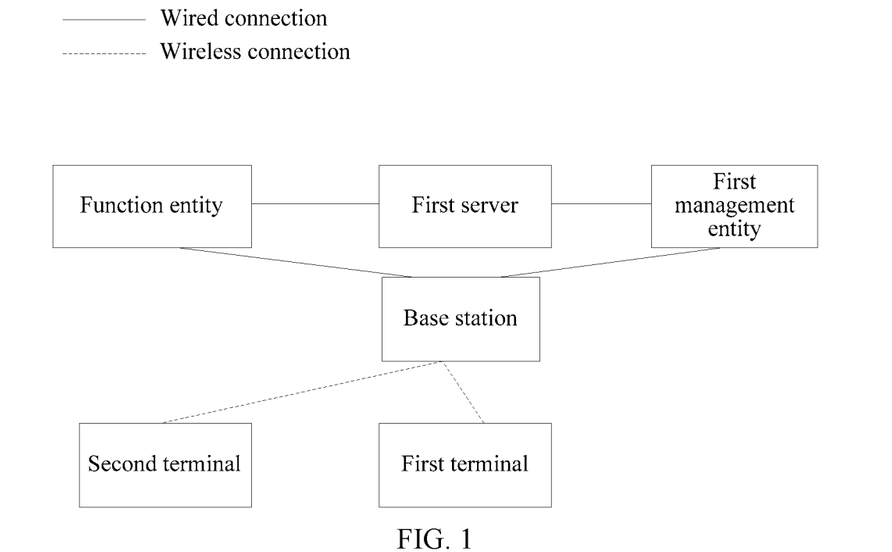
FIG. 1 is a schematic diagram of a device according to this application.

For ease of understanding, as shown in FIG. 1, a device in this application is first described.

A first terminal is a device that can provide a relay service. The relay service is that another terminal can access a network by using the first terminal. The first terminal may be specifically a device such as a smartphone or a portable computer.

A second terminal is a portable device that can be directly worn by a user, such as a smartwatch, a smart band, smart sports shoes, or smart glasses. The second terminal is configured with a SIM card, and a user can access a network by using the second terminal.

A first management entity is a control node that processes signaling exchange between a terminal and a core network. The first management entity is mainly responsible for security of signaling and user data. For example, the first management entity may be specifically an MME (Mobility Management Entity, mobility management entity).

A function entity is mainly configured to manage a proximity service between devices, for example, perform authentication on a proximity service that a WD accesses a network by using UE. For example, the function entity may be specifically a ProSe function (Proximity Services Function, proximity-services function) entity.

A first server mainly manages personal information of a user, for example, configuration information of service quality of a home core network and an access limitation for user roaming. For example, the first server may be specifically an HSS (Home Subscriber Server, home subscriber server).

A base station is a radio receiving and transmitting station for transferring information with a mobile phone terminal in a radio coverage area by using a mobile communication switching center.

It should be understood that the technical solutions provided in the embodiments of this application may be applied to various communications systems, for example, a Global System for Mobile Communications (Global System of Mobile communication, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunications System (Universal Mobile Telecommunications System, "UMTS" for short), a Worldwide Interoperability for Microwave Access (Worldwide Interoperability for Microwave Access, "WiMAX" for short) communications system, and a 5G communications system in the future.

Embodiment 1

This application describes in detail a first part of the entire technical solution: a registration part of a first terminal and a second terminal. This is specifically as follows:

In this embodiment of this application, the first terminal and the second terminal may separately send a registration request of a proximity service to a function entity. The proximity service may be specifically a service that the second terminal accesses a network by using a neighboring first terminal as a relay.

The function entity may allocate a first identifier and security information to the second terminal requesting registration. The first identifier may be specifically an access identifier remote WD ID of the second terminal.

The function entity allocates a second codeword to the first terminal requesting registration. The second codeword may be specifically a codeword used for relay discovery. For example, the second codeword may be specifically a particular relay code (Specific Relay Code).

As can be seen from above, in this technical solution, the second terminal requesting registration may obtain the first identifier and the security information, and the first terminal requesting registration may obtain the second codeword used for relay discovery. It should be noted that the first terminal and the second terminal may be managed by a same function entity, or may be managed by different function entities. In this embodiment of this application, for ease of description, a function entity managing the first terminal may be specifically referred to as a first function entity, and a function entity managing the second terminal is referred to as a second function entity. The first function entity and the second function entity may be specifically a same function entity, or may be different function entities. In this embodiment of this application, the first terminal may specifically send a registration request to the first function entity, and the first function entity allocates the second codeword used for relay discovery to the first terminal. The second terminal may specifically send a registration request to the corresponding second function entity, and the second function entity allocates the first identifier and the security information to the second terminal.

Embodiment 2

This application describes in detail a second part of the entire technical solution: a solution of mutual discovery between a second terminal and a first terminal. The first terminal may be configured with a first parameter. The first parameter may be specifically allowing all second terminals to perform access, or may be specifically allowing only a trusted second terminal to perform access. A user of the first terminal may autonomously set the first parameter of the first terminal based on a requirement of the user. In this embodiment of this application, based on whether the first parameter of the first terminal is set to allowing all the second terminals to perform access or to allowing only the trusted second terminal to perform access, there may be specifically the following two manners.

Figure 2:
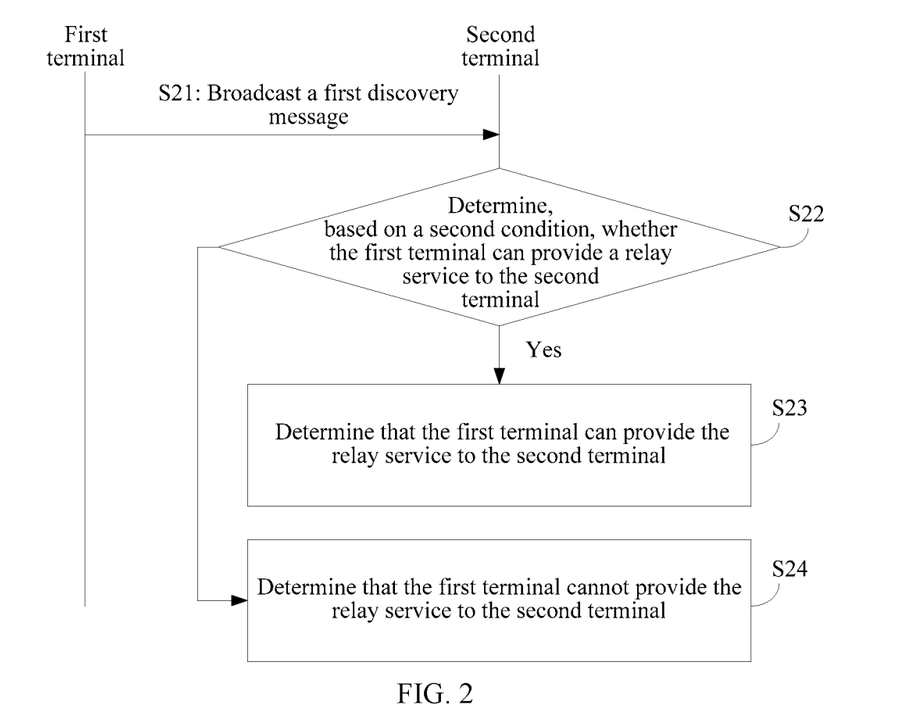
FIG. 2 is a schematic flowchart of mutual discovery between a first terminal and a second terminal according to this application.

In a first manner, in this embodiment of this application, when the user sets the first parameter of the first terminal to allowing all the second terminals to perform access, as shown in FIG. 2, a discovery process between the first terminal and the second terminal is specifically as follows.

S21: The first terminal broadcasts a first discovery message. The first discovery message is used to enable any terminal to discover the first terminal. The first discovery message may specifically include an address of the first terminal, an identifier of a public land network serving the first terminal, and at least one of a second parameter and a first codeword. The address of the first terminal may be specifically an address of a MAC (medium access control, Media Access Control) layer of the first terminal. The identifier of the public land network serving the first terminal may be specifically a serving PLMN (Public Land Mobile Network, public land mobile network) ID or a registered PLMN ID. The second parameter is used to indicate that the first discovery message is used for relay discovery. The first codeword may be specifically used to indicate a type of a relay service provided by the first terminal.

In actual application, the first terminal may provide different relay services, and the different relay services may be specifically represented by different codewords. For example, a codeword 0001 may represent that the first terminal may provide a relay service of an audio call, a codeword 002 represents that the first terminal may provide a relay service of video viewing, and details are not described herein.

Step S22: When receiving the first discovery message, the second terminal determines, based on a second condition, whether the first terminal can provide a relay service to the second terminal; and if the second condition is satisfied, performs step S23; or otherwise, performs step S24.

The second condition at least includes at least one of that an identifier of a public land network serving the second terminal is the same as the identifier of the public land network serving the first terminal and that a type of a relay service required by the second terminal is the same as the type of the relay service indicated by the first codeword.

Step S23: The second terminal determines that the first terminal can provide the relay service to the second terminal.

Step S24: The second terminal determines that the first terminal cannot provide the relay service to the second terminal.

The foregoing broadcast message includes the address of the first terminal. Therefore, the second terminal may discover the first terminal in the foregoing manner. The second terminal selects, as a relay, the first terminal whose public land network identifier is the same as that of the second terminal. Therefore, a type of a public land access network of the second terminal is the same as a type of a public land access network of the first terminal. For example, a second terminal using a network of China Unicom can select only a first terminal using the network of China Unicom.

Figure 3:
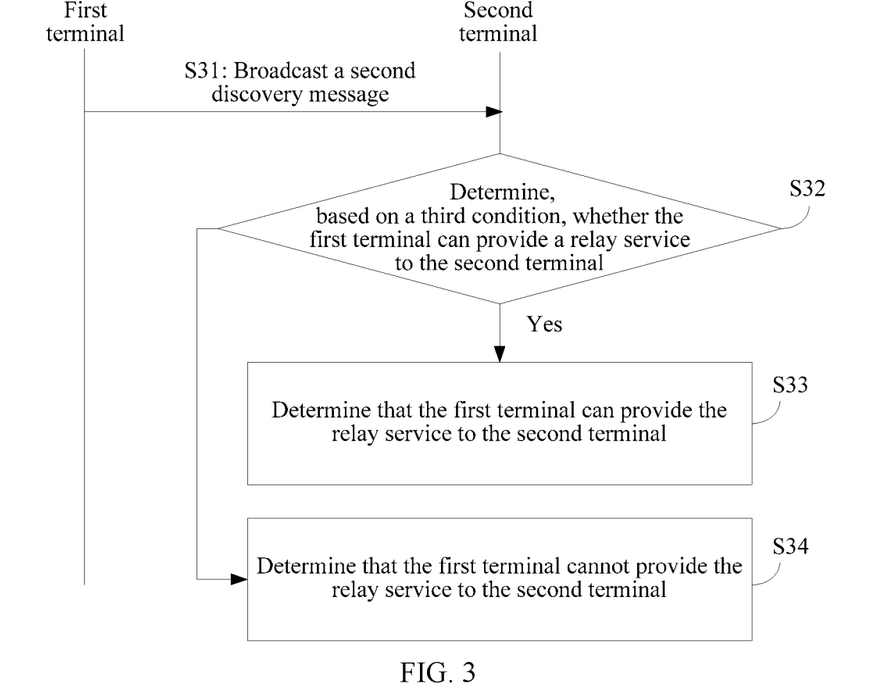
FIG. 3 is another schematic flowchart of mutual discovery between a first terminal and a second terminal according to this application.

In a second manner, in this embodiment of this application, when the user sets the first parameter of the first terminal to allowing only the authorized second terminal to perform access, as shown in FIG. 3, a discovery process between the first terminal and the second terminal is specifically as follows.

Step S31: The first terminal broadcasts a second discovery message. The second discovery message is used to enable a terminal having a trust relationship with the first terminal to discover the first terminal. The second discovery message may include an address of the first terminal, a second codeword of the first terminal, and a third parameter. For the second codeword, refer to the description of the first terminal in the registration stage in Embodiment 1, and details are not described herein again. The third parameter may specifically indicate that the second discovery message is used for relay discovery. A function of the third parameter is similar to a function of the second parameter in the first discovery message, and details are not described herein again.

Step S32: After receiving the second discovery message, the second terminal determines, based on a third condition, whether the first terminal can provide a relay service to the second terminal; and if the third condition is satisfied, performs step S33; or otherwise, performs step S34.

In this embodiment of this application, the third condition includes at least that the second codeword of the first terminal is the same as a third codeword stored by the second terminal, and the third codeword is sent by the first function entity to the second terminal when a trust relationship is established the first terminal and the second terminal.

As can be seen from the description of the registration part in Embodiment 1, when the second terminal and the first terminal perform registration, the first function entity allocates the second codeword only to the first terminal, and does not allocate the third codeword to the second terminal. In this embodiment of this application, the third codeword of the second terminal is sent by the first function entity to the second terminal when the trust relationship is established between the second terminal and the first terminal. A specific time of sending the third codeword is described in detail in Embodiment 3.

It should be noted that when the first function entity to which the first terminal belongs and a second function entity to which the second terminal belongs are two different function entities, the first function entity may specifically send the second codeword of the first terminal to the second function entity corresponding to the second terminal, to serve as the third codeword. Then, the second function entity forwards the third codeword to the second terminal. When the first function entity to which the first terminal belongs and the second function entity to which the second terminal belongs are a same entity, the first function entity may directly send the third codeword to the second terminal.

Step S33: The second terminal determines that the first terminal can provide the relay service to the second terminal.

Step S34: The second terminal determines that the first terminal cannot provide the relay service to the second terminal.

As can be seen from above, the first terminal may allow, in the foregoing manner, only the terminal having the trust relationship to perform access.

Embodiment 3

Figure 4:
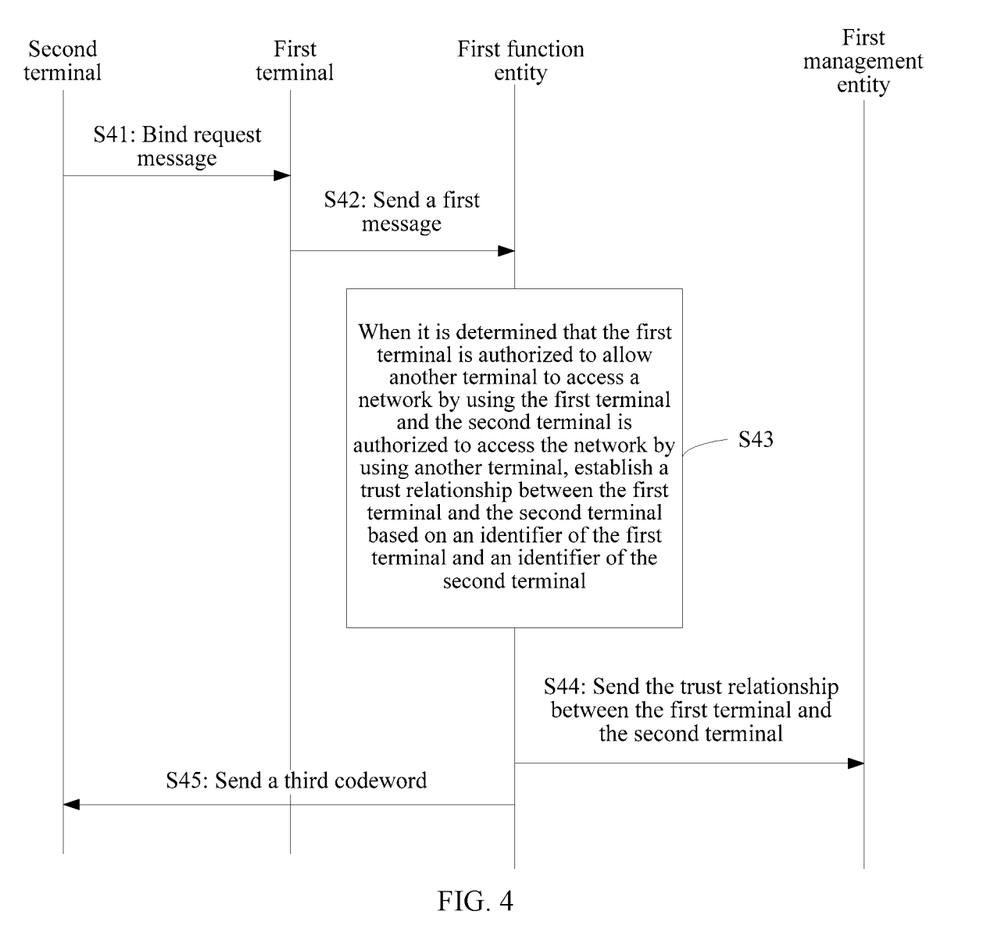
FIG. 4 is a schematic flowchart of establishing a trust relationship between a first terminal and a second terminal according to this application.

This embodiment of this application describes a third part of the entire technical solution: establishment of a trust relationship between a first terminal and a second terminal. As shown in FIG. 4, the technical solution is specifically as follows.

Step S41: The second terminal sends a bind request message to the first terminal. The bind request message may specifically include identification information of the second terminal.

Step S42: When receiving the bind request message, the first terminal sends a first message to a first function entity. The first message includes at least an identifier of the first terminal and an identifier of the second terminal, and the first message is used to request the first function entity to establish the trust relationship between the first terminal and the second terminal.

Step S43: When determining that the first terminal is authorized to allow another terminal to access a network by using the first terminal and the second terminal is authorized to access the network by using another terminal, the first function entity establishes the trust relationship between the first terminal and the second terminal based on the identifier of the first terminal and the identifier of the second terminal.

Step S44: The first function entity sends the trust relationship between the first terminal and the second terminal to a first management entity. The trust relationship may be that the first terminal authorizes the second terminal to access the network by using the first terminal.

It should be noted that in this embodiment of the present invention, the first function entity may directly send the trust relationship between the first terminal and the second terminal to the first management entity, or the first function entity may send the trust relationship to a first server, and then the first server forwards the trust relationship to the first management entity.

Specifically, in this embodiment of this application, the first message may further include second duration of the trust relationship. In this embodiment of this application, specifically, a user of the second terminal may set a time length of the second duration, and the second terminal may specifically report the second duration to the first terminal by using the bind request message. In this embodiment of this application, alternatively, a user of the first terminal may set a time length of the second duration, and the first terminal directly adds the second duration set by the user to the first message, and reports the first message to the first function entity. The second duration is effective duration of the trust relationship between the first terminal and the second terminal that is requested by the first terminal or the second terminal. In this embodiment of this application, the first function entity generates, based on the second duration in the first message, first duration of the trust relationship with the second terminal, where the first duration is actual effective duration of the trust relationship between the first terminal and the second terminal, sends the first duration of the trust relationship to the first terminal, and sends the first duration of the trust relationship and the identifier of the first terminal to the second terminal.

Step S45: The first function entity sends a third codeword to the second terminal. The third codeword is a codeword that is allocated by the first function entity to the first terminal and that is used for relay discovery.

In this embodiment of this application, for a process and meaning of sending the third codeword, refer to the description in Embodiment 2, and details are not described herein again.

As can be seen, according to the foregoing process, the trust relationship between the first terminal and the second terminal may be established. Based on the foregoing trust relationship, the first terminal may provide a relay service only to a second terminal having the trust relationship.

Embodiment 4

Figure 5:
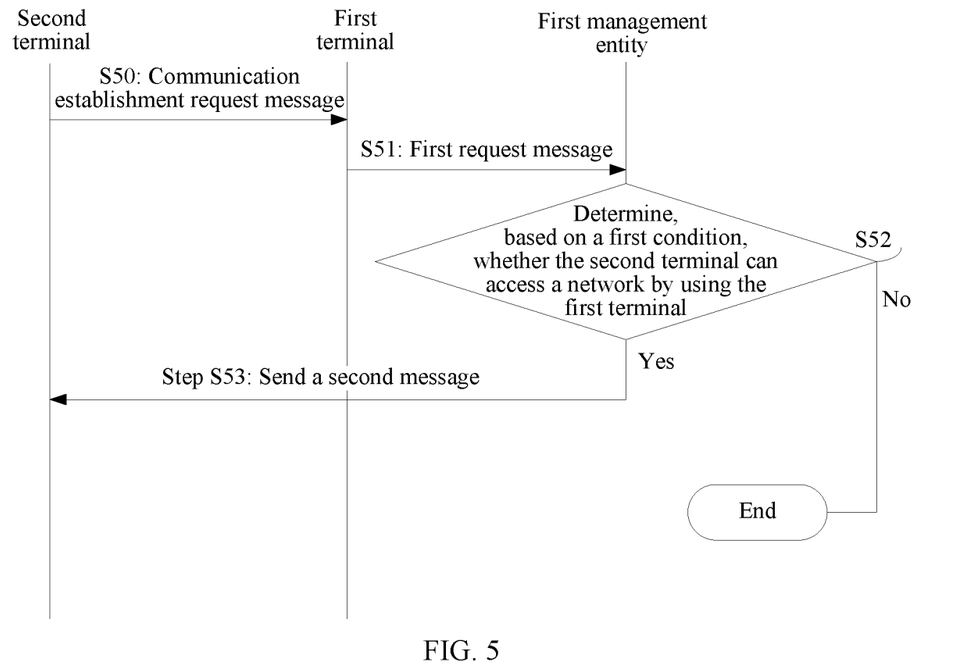
FIG. 5 is a schematic flowchart showing that a second terminal accesses a network according to this application.

The following describes a fourth part of the entire technical solution: access by a second terminal to a network. As shown in FIG. 5, this is specifically as follows.

Step S50: The second terminal sends a communication establishment request message to a first terminal. The communication establishment request message includes at least identification information of the second terminal and a temporary identifier of the second terminal. The temporary identifier may be a globally unique temporary identifier (GUTI), or may not be a globally unique temporary identifier.

Step S51: The first terminal sends a first request message to a first management entity.

The first request message includes at least one of a first identifier of the second terminal and the temporary identifier of the second terminal.

In this embodiment of this application, for the first identifier, refer to the description in Embodiment 1, and details are not described herein again.

Step S52: When receiving the first request message, the first management entity determines, based on a first condition, whether the second terminal can access the network by using the first terminal; and when the first condition is satisfied, performs step S53; or otherwise, ends the procedure.

In this embodiment of this application, the first condition includes at least one of that the first identifier of the second terminal belongs to a list of at least one terminal having a trust relationship with the first terminal, and that a first permanent user identifier corresponding to the temporary identifier of the second terminal is the same as a second permanent user identifier corresponding to the first identifier of the second terminal in the list. The list includes at least a first identifier of the at least one terminal having the trust relationship with the first terminal and a permanent user identifier of the at least one terminal having the trust relationship with the first terminal.

In this embodiment of this application, a first permanent network identifier corresponding to a temporary network identifier of the second terminal is obtained in the following manner: when a context of the second terminal is stored, obtaining, by the first management entity, the first permanent user identifier of the second terminal from the context of the second terminal; or when no context of the second terminal is stored, sending, by the first management entity, a request to a second management entity providing a service to the second terminal, to obtain the first permanent user identifier of the second terminal. The context of the second terminal stores a correspondence between the temporary network identifier and the first permanent user identifier of the second terminal.

In this embodiment of this application, the list of the at least one terminal having the trust relationship with the first terminal is obtained in the following manner: receiving, by the first management entity, a trust relationship between the first terminal and the second terminal that is sent by a first function entity, and generating, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, and the third request is used to establish the trust relationship between the first terminal and the second terminal; or receiving, by the first management entity, a trust relationship between the first terminal and the second terminal that is sent by a first server, and generating, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, the generated trust relationship between the first terminal and the second terminal is forwarded to the first server, and the third request is used to establish the trust relationship between the first terminal and the second terminal. In this embodiment of this application, the first request message further includes a first parameter of the first terminal. For the first parameter, refer to the description in Embodiment 2, and details are not described herein again. Step S52 may be specifically: when the first parameter indicates that only a terminal having the trust relationship is allowed to access the network, the first management entity determines, based on the first condition, whether the second terminal can access the network by using the first terminal; and when the first parameter indicates that any terminal is allowed to access the network, determines that any terminal can access the network by using the first terminal.

Step S53: The first management entity sends a second message to the second terminal. The second message is used to indicate that the second terminal can access the network by using the first terminal.

In this embodiment of this application, the second message may be used to indicate that the second terminal can access the network by using the first terminal, or a field in the second message may be used to indicate that the second terminal can access the network by using the first terminal.

Specifically, in this embodiment of this application, the list further includes first duration of the trust relationship between the first terminal and the second terminal, and the method further includes: when the trust relationship with the second terminal that is stored in the list reaches the first duration, deleting, by the first management entity, the trust relationship between the first terminal and the second terminal from the list.

As can be seen from above, access by the second terminal can be managed by using the foregoing method.

Embodiment 5

Figure 6:
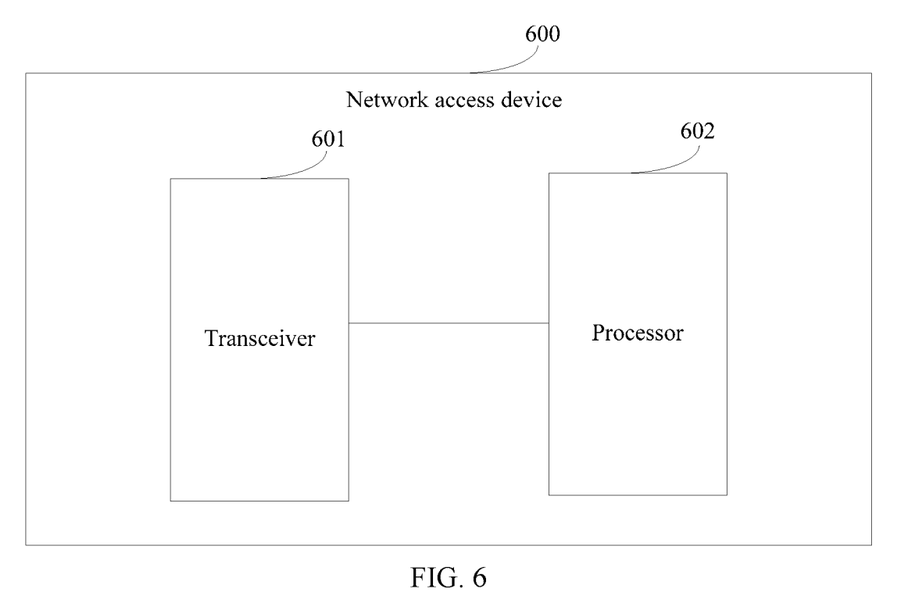
FIG. 6 is a schematic structural diagram of a network access device according to this application.

An idea herein is the same as the foregoing idea, and as shown in FIG. 6, this application further discloses a network access device 600, including:

a transceiver 601, configured to receive a first request message sent by a first terminal, where the first request message includes at least a first identifier of a second terminal; and a processor 602, configured to: determine, based on a first condition, whether the second terminal can access a network by using the first terminal; and when the first condition is satisfied, send, by the first management entity, a second message to the second terminal, where the second message is used to indicate that the second terminal can access the network by using the first terminal, the first condition includes at least that the first identifier of the second terminal belongs to a list of at least one terminal having a trust relationship with the first terminal, and the list includes at least a first identifier of the at least one terminal having the trust relationship with the first terminal.

Specifically, the first request message further includes a first parameter of the first terminal; and when determining, based on the first condition, whether the second terminal can access the network by using the first terminal, the processor is specifically configured to: when the first parameter indicates that only a terminal having the trust relationship is allowed to access the network, determine, based on the first condition, whether the second terminal can access the network by using the first terminal.

Specifically, the list of the at least one terminal having the trust relationship with the first terminal further includes a permanent user identifier of the at least one terminal having the trust relationship with the first terminal.

Specifically, the first request message further includes a temporary identifier of the second terminal, and the first condition further includes that a first permanent user identifier corresponding to the temporary identifier of the second terminal is the same as a second permanent user identifier corresponding to the first identifier of the second terminal in the list.

Specifically, the processor is further configured to: when a context of the second terminal is stored, obtain the first permanent user identifier of the second terminal from the context of the second terminal; or when no context of the second terminal is stored, send a request to a second management entity providing a service to the second terminal, to obtain the first permanent user identifier of the second terminal.

Specifically, the transceiver is further configured to receive a trust relationship between the first terminal and the second terminal that is sent by a first function entity; and the processor is further configured to generate, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, and the third request is used to establish the trust relationship between the first terminal and the second terminal. Alternatively, the transceiver is further configured to receive a trust relationship between the first terminal and the second terminal that is sent by a first server, and the processor is further configured to generate, based on the trust relationship, the list of the at least one terminal having the trust relationship with the first terminal, where the trust relationship between the first terminal and the second terminal is generated by the first function entity based on a third request of the first terminal when the first function entity determines that the first terminal is authorized to allow another terminal to access the network by using the first terminal and the second terminal is authorized to access the network by using another terminal, the generated trust relationship between the first terminal and the second terminal is forwarded to the first server, and the third request is used to establish the trust relationship between the first terminal and the second terminal.

Specifically, the list further includes first duration of the trust relationship between the first terminal and the second terminal, and the processor is further configured to: when the trust relationship with the second terminal that is stored in the list reaches the first duration, delete the trust relationship between the first terminal and the second terminal from the list.

Figure 7:
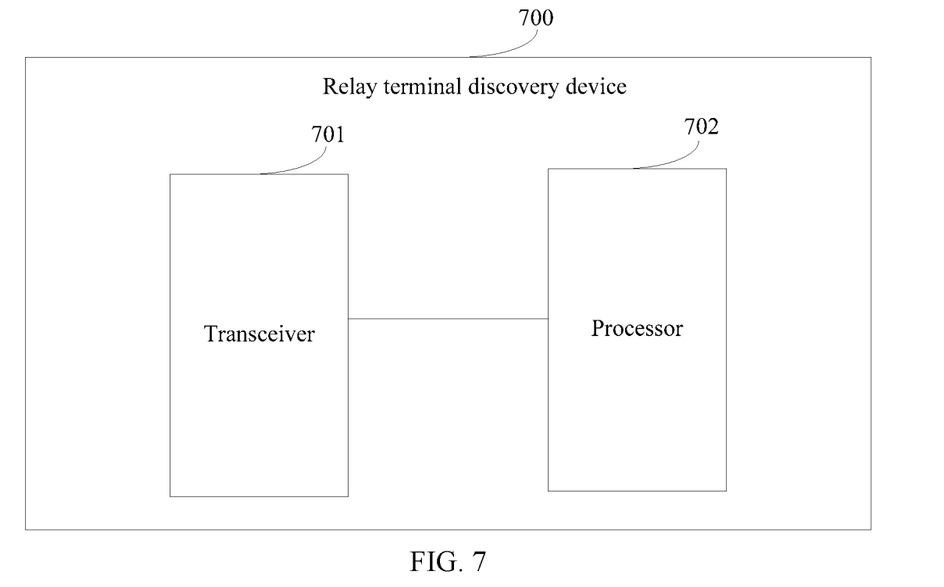
FIG. 7 is a schematic structural diagram of a relay terminal discovery device according to this application.

An idea herein is the same as the foregoing idea, and as shown in FIG. 7, this application further discloses a relay terminal discovery device 700, including:

a transceiver 701, configured to receive a first discovery message sent by a first terminal, where the first discovery message is used to enable any terminal to discover the first terminal, and the first discovery message includes at least an identifier of a public land network serving the first terminal; and a processor 702, configured to: determine, based on a second condition, whether the first terminal can provide a relay service to the second terminal; and when the second condition is satisfied, determine, by the second terminal, that the first terminal can provide the relay service to the second terminal, where the second condition includes at least that an identifier of a public land network serving the second terminal is the same as the identifier of the public land network serving the first terminal.

Specifically, the first discovery message further includes a second parameter, and the second parameter is used to indicate that the first discovery message is used for relay discovery.

Specifically, the first discovery message further includes a first codeword, and the first codeword is used to indicate a type of the relay service provided by the first terminal; and the second condition further includes that a type of a relay service required by the second terminal is the same as the type of the relay service indicated by the first codeword.

Figure 8:
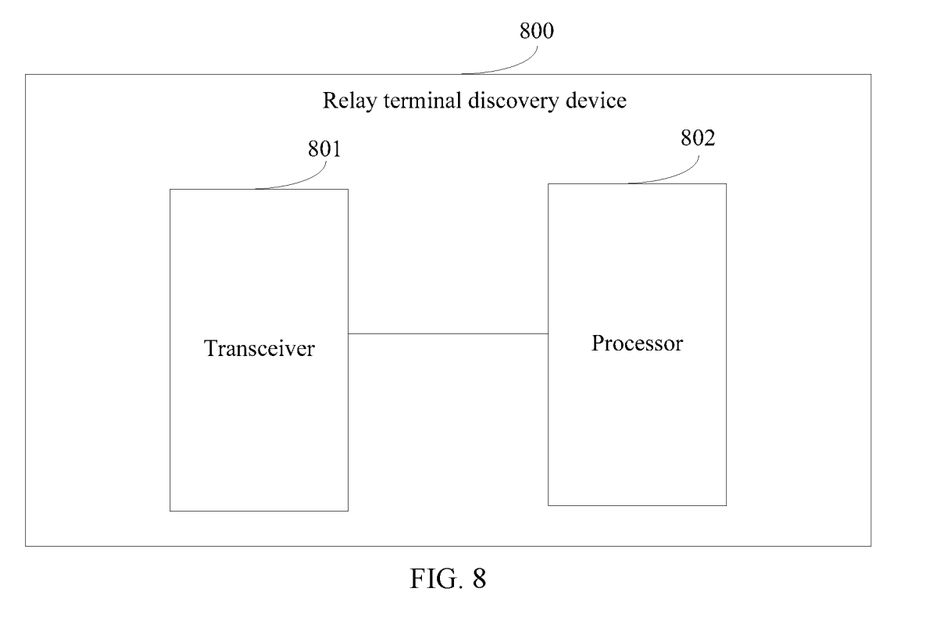
FIG. 8 is another schematic structural diagram of a relay device discovery device according to this application.

An idea herein is the same as the foregoing idea, and as shown in FIG. 8, this application further discloses a relay terminal discovery device 800, including:

a transceiver 801, configured to receive a second discovery message sent by a first terminal, where the second discovery message is used to enable a terminal having a trust relationship with the first terminal to discover the first terminal, the second discovery message includes at least a second codeword of the first terminal, and the second codeword is a codeword that is allocated by a first function entity to the first terminal and that is used for relay discovery; and a processor 802, configured to determine, based on a third condition, whether the first terminal can provide a relay service to the second terminal; and when the third condition is satisfied, determine, by the second terminal, that the first terminal can provide the relay service to the second terminal, where the third condition includes at least that the second codeword of the first terminal is the same as a third codeword stored by the second terminal, and the third codeword is sent by the first function entity to the second terminal when a trust relationship is established between the first terminal and the second terminal.

Specifically, the second discovery message further includes a third parameter, and the third parameter is used to indicate that the second discovery message is used for relay discovery.

Figure 9:
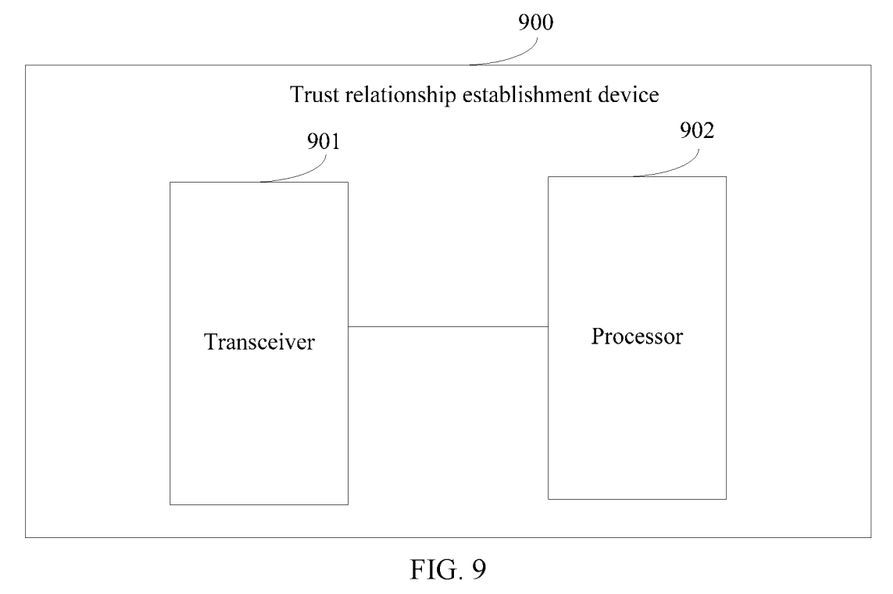
FIG. 9 is a schematic structural diagram of a trust relationship establishment device according to this application.

An idea herein is the same as the foregoing idea, and as shown in FIG. 9, this application further discloses a trust relationship establishment device 900, including:

a transceiver 901, configured to: receive a first message of a first terminal, and send a trust relationship between the first terminal and a second terminal to a first management entity, where the first message includes at least an identifier of the first terminal and an identifier of the second terminal, and the first message is used to request a first function entity to establish the trust relationship between the first terminal and the second terminal; and a processor 902, configured to: when it is determined that the first terminal is authorized to allow another terminal to access a network by using the first terminal and the second terminal is authorized to access the network by using another terminal, establish the trust relationship between the first terminal and the second terminal based on the identifier of the first terminal and the identifier of the second terminal.

Specifically, the first message further includes second duration of the trust relationship, and the second duration is effective duration of the trust relationship between the first terminal and the second terminal that is requested by the first terminal or the second terminal; and the processor is further configured to: generate first duration of the trust relationship with the second terminal based on the second duration in the first message, where the first duration is actual effective duration of the trust relationship between the first terminal and the second terminal.

Specifically, the processor is further configured to: after the trust relationship is established, send first duration of the trust relationship to the first terminal.

Specifically, the transceiver is further configured to: after the trust relationship is established, send a first codeword to the second terminal, where the first codeword is a codeword that is allocated by the first function entity to the first terminal and that is used for relay discovery.

Specifically, the transceiver is further configured to: after the trust relationship is established, send first duration of the trust relationship to the second terminal.

As can be seen from above, in the embodiments of this application, the first management entity can receive the first request message sent by the first terminal, and determine, based on the first condition, whether the second terminal can access the network by using the first terminal. When the first terminal satisfies the first condition, the first management entity sends the second message to the second terminal. The second message may indicate that the second terminal can access the network by using the first terminal. In the manners disclosed in the embodiments of this application, when the first terminal is user equipment and the second terminal is a wearable device, the wearable device can be authenticated, so that only the wearable device satisfying the first condition can access the network by using the user equipment.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction device. The instruction device implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments. The present invention is intended to cover these modifications and variations provided that they fall within the scope of protection defined by the following claims and their equivalent technologies.

What is claimed is:

1. A trust relationship establishment method, comprising:
receiving, by a first function entity, a first message of a first terminal, wherein the first message comprises at least an identifier of the first terminal and an identifier of a second terminal, and the first message is used to request the first function entity to establish a trust relationship between the first terminal and the second terminal, wherein the first terminal is a device that can provide a relay service;
in response to determining that the first terminal is authorized to allow another terminal to access a network by using the first terminal and the second terminal is authorized to access the network by using another terminal, establishing, by the first function entity, the trust relationship between the first terminal and the second terminal based on the identifier of the first terminal and the identifier of the second terminal;
after establishing the trust relationship between the first terminal and the second terminal, sending, by the first function entity, a first duration of the trust relationship to the first terminal and to the second terminal separately; and
sending, by the first function entity, the trust relationship between the first terminal and the second terminal to a first management entity, wherein the first management entity is a network node that is different from the first function entity, the first terminal, or the second terminal, and the trust relationship sent from the first function entity to the first management entity indicates that the first terminal authorizes the second terminal to access the network by using the first terminal.

2. The method according to claim 1, wherein the first message further comprises second duration of the trust relationship, and the second duration is effective duration of the trust relationship between the first terminal and the second terminal that is requested by the first terminal or the second terminal; and
the method further comprises:

generating, by the first function entity, the first duration of the trust relationship with the second terminal based on the second duration in the first message, wherein the first duration is actual effective duration of the trust relationship between the first terminal and the second terminal.

3. The method according to claim 1, wherein the method further comprises:
after establishing the trust relationship, sending, by the first function entity, a first codeword to the second terminal, wherein the first codeword is a codeword that is allocated by the first function entity to the first terminal and that is used for relay discovery.

4. A trust relationship establishment device, comprising:
a transceiver, configured to:
receive a first message of a first terminal,
send a trust relationship between the first terminal and a second terminal to a first management entity, wherein the first message comprises at least an identifier of the first terminal and an identifier of the second terminal, the first message is used to request a first function entity to establish the trust relationship between the first terminal and the second terminal, the first terminal is a device that provides a relay service, wherein the first management entity is a network node that is different from the first function entity, the first terminal, or the second terminal, and the trust relationship sent to the first management entity indicates that the first terminal authorizes the second terminal to access the network by using the first terminal, and
send a first duration of the trust relationship to the first terminal and to the second terminal separately; and
a processor, configured to: in response to determining that the first terminal is authorized to allow another terminal to access a network by using the first terminal and the second terminal is authorized to access the network by using another terminal, establish the trust relationship between the first terminal and the second terminal based on the identifier of the first terminal and the identifier of the second terminal.

5. The device according to claim 4, wherein the first message further comprises second duration of the trust relationship, and the second duration is effective duration of the trust relationship between the first terminal and the second terminal that is requested by the first terminal or the second terminal; and the processor is further configured to:
generate the first duration of the trust relationship with the second terminal based on the second duration in the first message, wherein the first duration is actual effective duration of the trust relationship between the first terminal and the second terminal.

6. The device according to claim 4, wherein the transceiver is further configured to:
after the trust relationship is established, send a first codeword to the second terminal, wherein the first codeword is a codeword that is allocated by the first function entity to the first terminal and that is used for relay discovery.

* * * * *